April 11, 1939.  S. W. ALDERFER  2,154,371
RUBBER TAPE FORMING AND SEPARATING APPARATUS
Filed June 4, 1937  2 Sheets-Sheet 1

INVENTOR
STERLING W. ALDERFER
BY Albert L. Ely
ATTORNEY

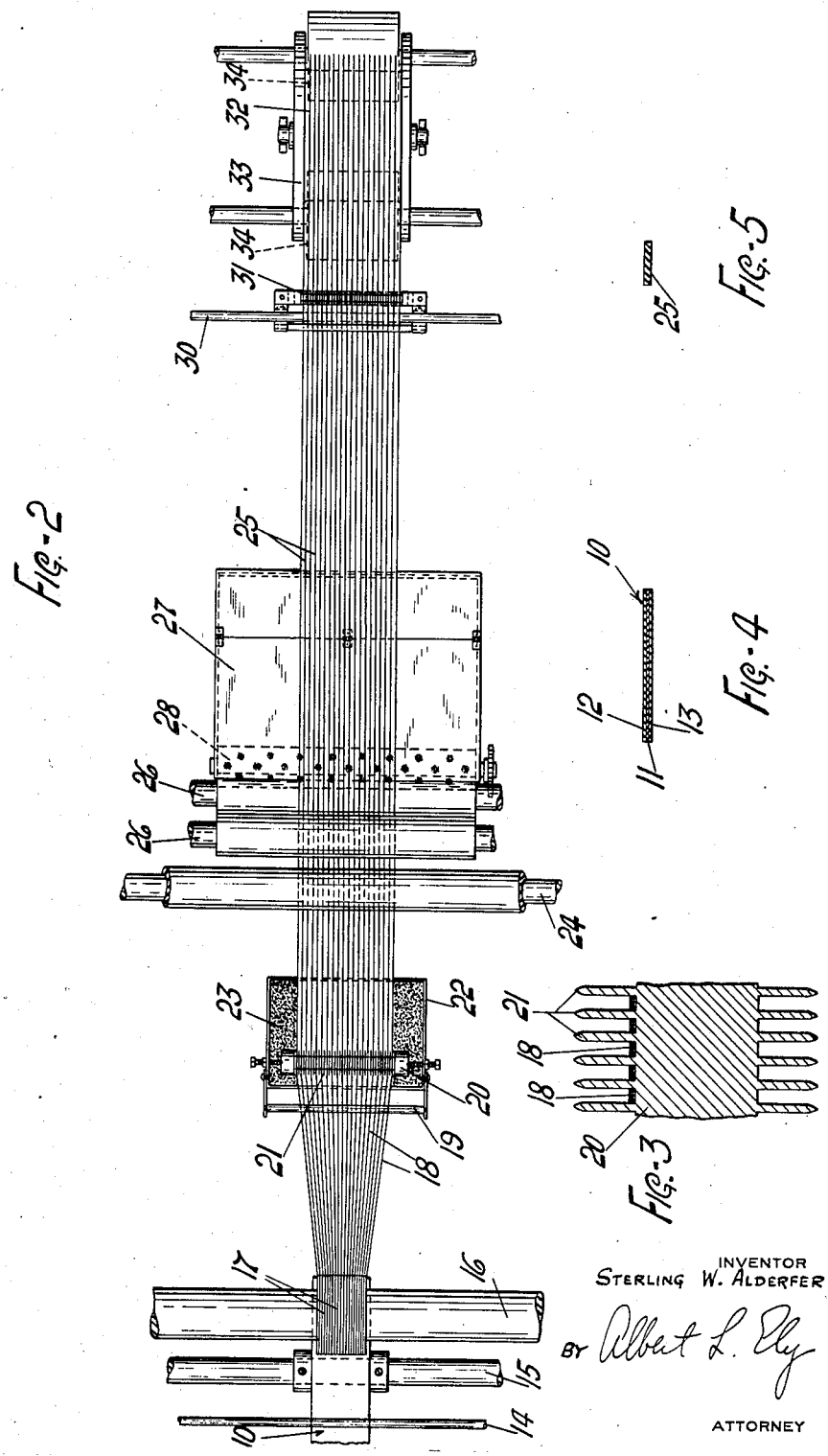

Patented Apr. 11, 1939

2,154,371

UNITED STATES PATENT OFFICE 2,154,371

RUBBER TAPE FORMING AND SEPARATING APPARATUS

Sterling W. Alderfer, Akron, Ohio, assignor, by mesne assignments, to The Firestone Tire & Rubber Company, Akron, Ohio, a corporation of Ohio Application June 4, 1937, Serial No. 146,468

11 Claims. (Cl. 164—65)

This invention relates to an apparatus for forming and separating rubber tape which is adapted for use as rubber thread in forming elastic fabric, winding golf balls, etc. More particularly the invention relates to an apparatus which may be used in carrying out the method of making rubber tape disclosed and claimed in my copending application Serial No. 90,721, filed July 15, 1936.

In general, the method referred to involves depositing a liquid dispersion of rubber on one or both sides of a sheet of destructible material to provide a composite sheet, cutting the composite sheet into a plurality of composite strips, and separating the strips of rubber from the strips of backing material. Some of the objects of the present invention are to provide an apparatus to receive this composite sheet which has been coated on both sides with a liquid dispersion of rubber and to cut this sheet into a plurality of composite strips. The composite strips are then spread apart and guided in spaced relation through a pair of rolls after which the rubber strips are separated from the backing strips. In separating the strips, the rubber strips on the upper surface of the backing strips are directed upwardly in spaced relation to a receiving drum, the lower rubber strips are similarly directed downwardly to a receiving drum, while the strips of backing material are directed in a path intermediate the rubber strips.

Other objects and advantages will become apparent from the following description taken in conjunction with the accompanying drawings.

In the drawings:

Fig. 2 is a plan view with parts cut away and shown more or less diagrammatically;

Fig. 3 is an enlarged fragmentary sectional view through one of the spreader rolls;

Fig. 4 is an enlarged sectional view through the composite sheet of material; and Fig. 5 is an enlarged sectional view through one of the rubber strips.

Figure 1:
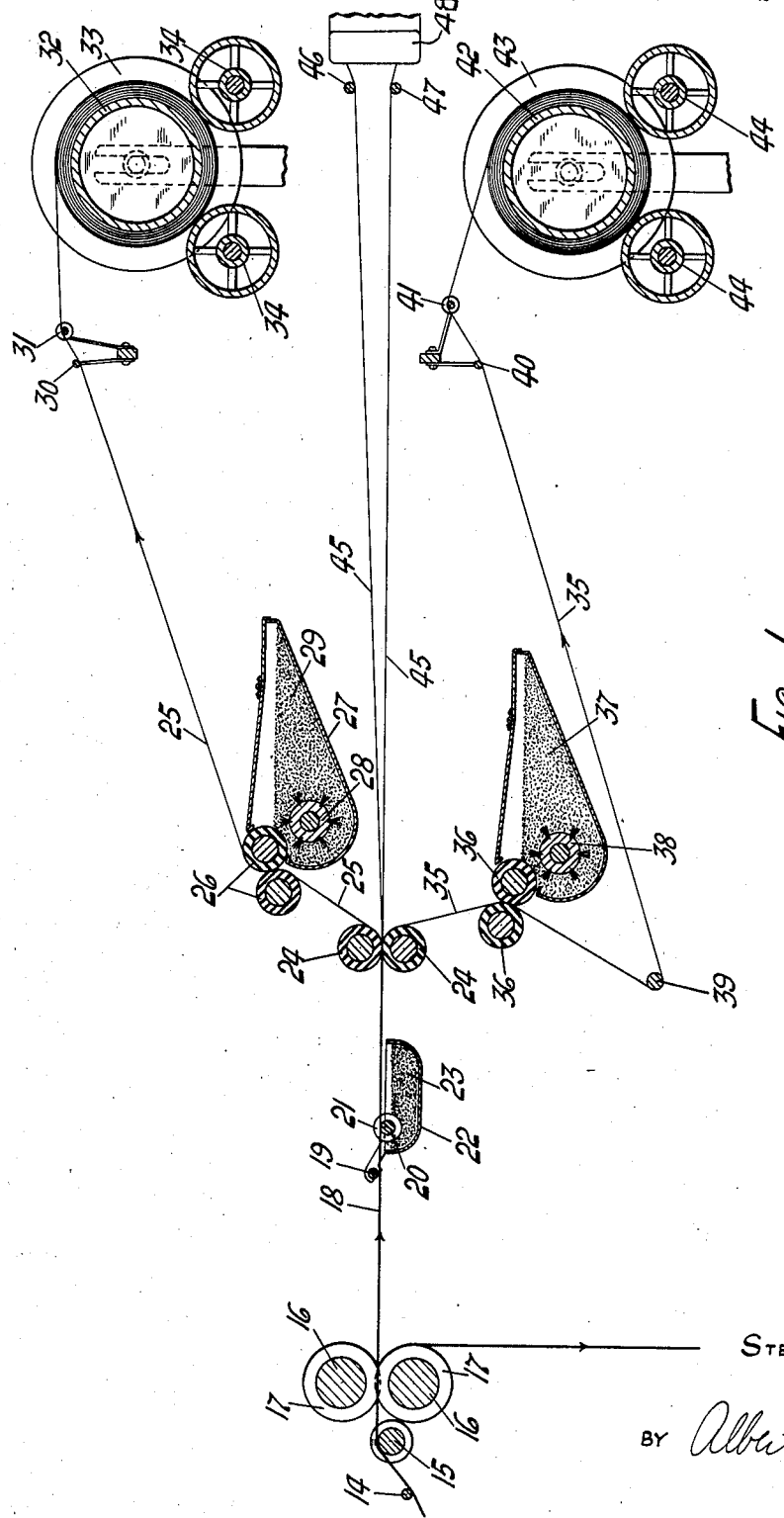
Fig. 1 is a longitudinal sectional view through the apparatus showing the various parts more or less diagrammatically.

In the drawings the numeral 10 designates, as a whole, a sheet of composite material comprising a backing sheet 11 of destructible material and upper and lower sheets 12 and 13 of rubber formed with either natural or artificial liquid dispersions of vulcanized or unvulcanized rubber. The destructible material used in this instance is a rubber hydrohalide film sold under the trade name "Pliofilm" and which is manufactured in accordance with Calvert Patent No. 1,989,632, January 29, 1935. This material is preferred because the liquid dispersions readily adhere thereto and the rubber strips readily separate therefrom, while the material may be cut easily and evenly into strips. Obviously, however, other suitable destructible material may be utilized as a backing sheet and the rubber coating may be applied by spraying the backing sheet or by dipping the latter in a liquid dispersion of the rubber.

The composite sheet 10 may be formed in a continuous roll (not shown) to be fed to the apparatus and before entering the latter is preferably soapstoned on both sides to prevent sticking. As the continuous sheet enters the apparatus it passes under a holding bar 14, and over an idle guide roller 15 between a pair of driven cutting rollers 16. Each roller 16 is provided with a plurality of spaced annular cutting blades or discs 17, which overlap as indicated in Fig. 1 and cut the sheet into a plurality of composite strips 18. The latter now pass under a holding bar 19 and over an idle spreader roll 20 which is provided with a plurality of annular ribs 21 between which strips 18 are adapted to pass, as clearly indicated in Fig. 3, whereby these strips will be properly spaced apart. Bar 19 and spreader roll 20 may be suitably mounted in the frame of a container 22 which may be filled with soapstone 23 or the like, whereby roll 20 may rotate in this soapstone and apply additional quantities of the latter to the composite strips 18. Next, the latter pass between a pair of driven draw rolls 24, preferably having rubber outer surfaces which are in contact, as shown in Fig. 1.

Upon leaving rolls 24, the composite strips 18 are separated and the rubber on the upper surfaces thereof form a plurality of rubber strips or tapes 25 which are directed upwardly through a pair of driven draw rolls 26, also preferably formed of rubber. One of the rolls 26 is mounted to rotate in a soapstone chamber 27 which carries a driven brush roll 28 adapted to supply soapstone 29 to the surface of roll 26 for application to tapes 25. Tapes 25 now pass under a holding bar 30 and over a spreader member 31, divided similarly to member 20, onto a rotatable receiving drum 32 upon which the rubber tapes are wound into a plurality of rolls. Drum 32 has side flanges 33 which confine the tapes to the drum and the latter is preferably driven through frictional contact with a pair of felt covered driven rolls 34 arranged on opposite sides of the drum.

Similarly, the rubber on the lower surfaces of the composite strips 18 is separated therefrom and forms a plurality of rubber strips or tapes 35 which are directed downwardly through a pair of rubber covered, driven draw rolls 36. One of the rolls 36 is mounted to rotate in soapstone in the same manner as the similar roll 26, whereby soapstone 37 is brushed on roller 36 by a driven brush 38. Tapes 35 next pass around an idle guide roller 39, under a holding bar 40 and over a spreader member 41, similar to member 31, onto a rotatable receiving drum 42. The latter is similar to drum 32, has side flanges 43 and is driven by frictional contact with a pair of spaced, felt covered, driven rollers 44. Tapes 35 are wound into a plurality of rolls on drum 42.

The strips of backing material 45, after the rubber strips have been separated therefrom are directed out of the apparatus so as not to interfere with the rubber strips. As shown, strips 45 are divided into two groups, one of which passes around fixed guide rod 46 while the other group passes around a similar guide rod 47. If it is desired to save the strips of backing material they may be collected on suitable drums or rolls (not shown) or if these strips are to be scrapped they may be collected in a suction device, a part of which is shown diagrammatically at 48. In any event, the strips of backing material have served a definite purpose in the forming of the rubber tape as will be apparent.

It will be obvious that all of the driven rolls in the apparatus may be driven from a single source of power by means of a drive chain (not shown) or the like, but since such driving means is conventional and well understood in the art, no further reference need be made thereto. As will be noted from Fig. 2, drums 32 and 42 are in vertical alignment and the rubber tapes 25 and 35 are wound thereon without undue tension. If unvulcanized liquid dispersions of rubber are utilized in forming the composite sheet 10, it will, of course, be necessary to vulcanize the rolls of rubber tape on drums 32 and 42, but if vulcanized liquid dispersions are used, no subsequent vulcanization of the rubber tapes is necessary.

It is believed to be apparent that I have provided a novel apparatus which will readily form the composite strips and which will readily separate the rubber strips from the backing strips, collecting the rubber strips in rolls for future use.

Although I have illustrated and described the preferred form of my invention, it is to be understood that the invention is not to be so limited, and various modifications may be resorted to without departing from the spirit of the invention or from the scope of the subjoined claims.

What is claimed is:

1. An apparatus for cutting and separating strip material comprising means for directing a composite sheet formed of a plurality of layers of material into the apparatus, means for cutting said sheet into a plurality of composite strips, means for separating each composite strip into separate layers to thereby form a plurality of strips, and means for collecting the latter strips.

2. An apparatus for cutting and separating strip material comprising means for directing a composite sheet formed of at least three layers of material into the apparatus, means for cutting said sheet into a plurality of composite strips, means for separating each composite strip into separate layers to thereby form at least three strips, and separate means for collecting each of the latter strips.

3. An apparatus for cutting and separating rubber tape comprising means for directing into the apparatus a composite sheet formed of at least one layer of rubber and one layer of backing material for the rubber, means for cutting said sheet into a plurality of composite strips, means for separating each composite strip into at least one strip of rubber and one strip of backing material, means for collecting each rubber strip, and a separate means for collecting each strip of backing material.

4. An apparatus for cutting and separating rubber tape comprising means for directing into the apparatus a composite sheet formed of a layer of backing material coated on each side with a layer of rubber, means for cutting said sheet into a plurality of composite strips, means for separating each composite strip into upper and lower strips of rubber and an intermediate strip of backing material, a common means for collecting each upper strip of rubber, a separate common means for collecting each lower strip of rubber, and a separate means for collecting the strips of backing material.

5. In an apparatus for cutting and separating strip material from a composite sheet formed of a plurality of layers of material, the sub-combination of means for cutting said sheet into a plurality of composite strips and means for separating each composite strip into separate layers to thereby form a plurality of single strips.

6. In an apparatus for cutting and separating rubber tape from a composite sheet formed of at least one layer of rubber and one layer of backing material for the rubber, the sub-combination of means for cutting said sheet into a plurality of composite strips and means for separating each composite strip into a strip of rubber and a strip of backing material.

7. In an apparatus for cutting and separating rubber tape from a composite sheet formed of at least one layer of rubber and one layer of backing material for the rubber, the sub-combination of means for cutting said sheet into a plurality of composite strips, means for separating each composite strip into a strip of rubber and a strip of backing material and a common means for collecting each of said rubber strips.

8. In an apparatus for cutting and separating rubber tape from a composite sheet formed of at least one layer of rubber and one layer of backing material for the rubber, the sub-combination of means for cutting said sheet into a plurality of composite strips, means for separating each composite strip into a strip of rubber and a strip of backing material, a common means for collecting each of said rubber strips and a separate means for collecting the strips of backing material.

9. In an apparatus for cutting and separating rubber tape from a composite sheet formed of a layer of backing material coated on each side with a layer of rubber, the sub-combination of means for cutting said sheet into a plurality of composite strips and means for separating each composite strip into upper and lower strips of rubber and an intermediate strip of backing material.

10. In an apparatus for cutting and separating rubber tape from a composite sheet formed of a layer of backing material coated on each side with a layer of rubber, the sub-combination of means for cutting said sheet into a plurality of composite strips, means for separating each composite strip into upper and lower strips of rubber and an intermediate strip of backing material, a common means for collecting each of the upper strips of rubber, and a different common means for collecting each of the lower strips of rubber.

11. In an apparatus for cutting and separating rubber tape from a composite sheet formed of a layer of backing material coated on each side with a layer of rubber, the sub-combination of means for cutting said sheet into a plurality of composite strips, means for separating each composite strip into upper and lower strips of rubber and an intermediate strip of backing material, a common means for collecting each of the upper strips of rubber, a different common means for collecting each of the lower strips of rubber, and a separate means for collecting the strips of backing material.

STERLING W. ALDERFER.